United States Patent

Siol et al.

[11] Patent Number: 4,952,455
[45] Date of Patent: Aug. 28, 1990

[54] COMPATIBLE POLYMER MIXTURES

[75] Inventors: Werner Siol, Darmstadt-Eberstadt; Ulrich Terbrack, Reinheim, both of Fed. Rep. of Germany

[73] Assignee: Rohm GmbH Chemische Fabrik, Darmstadt, Fed. Rep. of Germany

[21] Appl. No.: 422,670

[22] Filed: Oct. 17, 1989

Related U.S. Application Data

[62] Division of Ser. No. 233,753, Aug. 19, 1988, Pat. No. 4,897,441.

[51] Int. Cl.$^5$ .................. D01F 8/10; B32B 27/02; B32B 27/30
[52] U.S. Cl. .................. 428/373; 428/520; 350/96.29; 350/96.34
[58] Field of Search .................. 428/373, 520; 350/96.34, 96.29

[56] References Cited

U.S. PATENT DOCUMENTS

| | | | |
|---|---|---|---|
| 3,619,344 | 11/1971 | Wolinski et al. | 428/520 |
| 3,833,404 | 9/1974 | Sperling et al. | 428/520 |
| 4,350,742 | 9/1982 | Hall et al. | 428/520 |
| 4,381,269 | 4/1983 | Kaino et al. | 350/96.34 |
| 4,861,835 | 8/1989 | Maeda et al. | 350/96.29 |
| 4,883,338 | 11/1989 | Abe et al. | 350/96.29 |

Primary Examiner—Carman J. Seccuro
Attorney, Agent, or Firm—Oblon, Spivak, McClelland, Maier & Neustadt

[57] ABSTRACT

A compatible polymer mixture, comprising:
(I) 0.1–99.9 wt. % of a polymer P1, comprised of monomer units of formula I

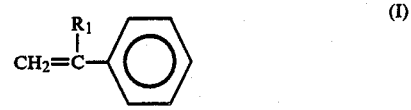

wherein $R_1$ is hydrogen or a methyl group; and
(II) 99.9–9–0.1 wt. % of a copolymer P2, comprised of:
30–90 parts by wt. of a methacrylic acid ester monomer of formula II

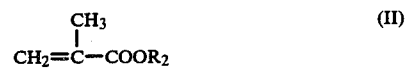

wherein $R_2$ is methyl or ethyl;
70–10 parts by wt. of a methacrylic acid ester monomer of formula III

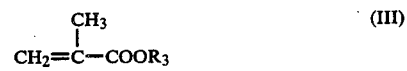

wherein $R_3$ is a hydrocarbon group with 3–24 carbon atoms; and
0–10 parts by wt. of a third monomer M which is copolymerizable with but different from the monomers of formulas II and III.

7 Claims, No Drawings

COMPATIBLE POLYMER MIXTURES

This a division, of application Ser. No. 07/233,753, filed on Aug. 19, 1988, now Pat. No. 4897441.

BACKGROUND OF THE INVENTION

1. Field of the Invention:

The invention relates to compatible polymer mixtures comprised of at least two different polymer components, one of which (P1) is a polystyrene, and the other (P2) is a copolymer of esters of methacrylic acid.

2. Discussion of the Background:

As a rule, different polymer species are considered to be incompatible, i.e. they do not form a homogeneous phase except at very small concentrations of one of the components (a homogeneous phase being characterized by complete miscibility of the components).

Certain exceptions to this rule have attracted great interest, particularly among specialists concerned with the theoretical significance of the phenomena.

"Completely compatible" mixtures of polymers have complete solubility (miscibility) in all mixture ratios. The glass temperature, Tg, or the so-called "optical method" (clarity of a film cast from a homogeneous solution of the polymer mixture), is often used to demonstrate miscibility. (See Brandrup-Immergut, "Polymer Handbook", 2nd Ed., III:211–213; and 1982 "Kirk-Othmer Encyclopedia of Chemical Technology", 3rd Ed., pub. John Wiley & Sons, 18:443–478 )

An example of nearly complete incompatibility is the polymer system polystyrene/polymethyl methacrylate (PMMA). (See Olabisi, O., Robeson, L.M., and Shaw, M.T., 1979, "Polymer-Polymer Miscibility", pub. Academic Press, pp. 4 ff.) For example, for PMMA with molecular weight 160,000, miscibility is observed only up to 3.5 ppm PMMA in polystyrene (see Shaw, M.T., et al., 1984, Adv. Chem Ser., 206:33–42). Polystyrene is also incompatible with polyethyl-, polypropyl-, polybutyl-, polyhexyl-, and polydecyl methacrylate, as well as with other polymethacrylic acid esters such as poly-3,3,5-trimethylcyclohexyl methacrylate and polyisobornyl methacrylate (see the unpublished Ger. Pat. App. P 36 32 369.1). The only exception is polycyclohexyl methacrylate, which is compatible with polystyrene in all mixture ratios over the entire accessible temperature range.

Mechanically produced mixtures of polymers (polyblends) have led to plastics products with improved properties, in particular cases and in specific areas of the plastics industry. (See Kirk-Othmer, loc cit ) The physical properties of such polyblends ordinarily represent a compromise which generally cannot provide an improvement over the properties of the individual polymers An example of a compatible polyblend of industrial importance is the system poly(2,6-dimethyl-1,4-phenylene oxide)/polystyrene, wherein the polyphenylene oxide component contributes a higher glass temperature Tg and improved impact strength, and the polystyrene component lowers the price of the product Addition of the polystyrene also reduces the processing temperature of the polyphenylene oxide. (See Olabisi et al., loc. cit., pp. 14–15) However, multiphase polymer mixtures have attained a much greater commercial importance than compatible mixtures (see Kirk-Othmer, loc cit., p. 449). There are sharp differences between the physical properties, particularly technically important properties such as optical properties (transparence, clarity, etc.), of multiphase (incompatible) polymer mixtures and those of compatible polymer mixtures. Compatible polymer mixtures notably differ from multiphase mixtures by, e.g., the presence of a single glass temperature Tg. It is known that the glass temperature can affect other properties such as the variation of shear modulus of elasticity with temperature, creep properties, viscosity, crystallization behavior of the plastic, etc. (see Olabisi et al., loc. cit., pp. 321–358). Also, as mentioned, incomplete compatibility frequently imposes narrow limits on any attempt to improve the overall property spectrum of a plastic.

SUMMARY OF THE INVENTION

Accordingly, one object of the present invention is to provide compatible polymer mixtures of polystyrene and polyalkylmethacrylates which have improved properties This and other objects which will become apparent from the following specification have been achieved by the surprising discovery that the complete incompatibility of polyalkyl methacrylates with polystyrene can be modified if certain well-defined, selected alkyl methacrylate polymers are copolymerized in specific, exactly limited ratios

DETAILED DESCRIPTION OF THE PREFERRED EMBODIMENTS

The invention relates in particular to compatible polymer mixtures PM comprised of:

(I) A polymer P1, in the amount of 0.1–99.9 wt.%, preferably 30.0–99 wt.%, particularly preferably 40–90 wt.%, wherein polymer P1 is comprised of monomer units of formula I

wherein $R_1$ represents hydrogen or a methyl group; and (II) A copolymer P2, in the amount of 99.9–0.1 wt.%, preferably 70–wt.%, particularly preferably 60–10 wt.%, wherein polymer P2 is comprised of:

30–90 parts by wt. of a methacrylate monomer of formula II

wherein $R_2$ represents methyl or ethyl, preferably methyl;

70–10 parts by wt. of a methacrylate monomer of formula III

wherein $R_3$ represents a hydrocarbon group with 3–24 carbon atoms, preferably 4–18 carbon atoms, with the constraint that $R_3$ is not a cyclohexyl group; and 0–10 parts by wt., preferably 1–10 parts by wt., of a third monomer M which is copolymerizable with the monomers of formulas II and III, with the constraint that preferably monomer M is not cyclohexyl (meth)acrylate In each instance, the proportions of the monomers of formulas II and III and the monomer M add to 100 parts by wt.

In general, $R_3$ represents a linear or branched, but preferably linear unbranched, alkyl group, or an optionally substituted cycloalkyl group (other than cyclohexyl) with from 3 to 24, preferably 4 to 18, carbon atoms, with the condition that as the number of carbon atoms in the group $R_3$ is increased the relative proportion of monomer III in the copolymer P2 should be decreased, i.e. the relative proportion of the monomer varies in the direction opposite to any change in the number of carbon atoms in the group $R_3$.

The exclusion of cyclohexyl methacrylate is based on the fact that for this monomer the basic physicochemical situation is different than for the polymer system of the present invention.

As a proportioning rule for the amount of the monomer of formula II in copolymer P2 one may use the following equation:

$$\text{wt. \% monomer III} = \frac{100 \times \text{M.W. monomer II}}{\text{M.W. monomer II} + \text{M.W. monomer III}},$$

where M.W. stands for molecular weight.

The compatibility of the present mixtures is particularly surprising since, as already mentioned, polymethyl methacrylate and polybutyl methacrylate are individually incompatible with polystyrene. According to the invention a copolymer comprised of methyl methacrylate in the amount of 50 wt.% and butyl methacrylate in the amount of 50 wt.% is compatible with polystyrene in all mixing ratios (see Table 1).

Similarly, for example, the copolymer 70 wt.% methyl methacrylate/30 wt.% decyl methacrylate is compatible with polystyrene in all ratios (See Table 2).

Noteworthy is the fact that it is precisely the high polystyrene mixtures which have good compatibility For specific comonomer partners there are limits on the comonomer composition for compatibility with polystyrene The ratios thus are to an extent analogous with the known "miscibility windows" in the system SAN/PMMA (where SAN is a styrene/acrylonitrile copolymer).

For the occurrence of such a miscibility window in the system polystyrene/methacrylate acid ester copolymer, according to the observations made in connection with the invention, the relative chain lengths of the alkyl groups of the copolymerized methacrylate esters are an important factor. As the results in Table 1 indicate, a difference of 3 carbon atoms in the alkyl group (e.g., butyl as compared with methyl) is sufficient to create a miscibility window.

Thus, whereas polymethyl methacrylate and polybutyl methacrylate are individually incompatible with polystyrene, copolymers comprised of methyl methacrylate in the proportion of, e.g., 40–50 wt.% and butyl methacrylate in the proportion of, e.g., 60–50 wt.% are highly compatible with polystyrene On the other hand, copolymers comprised of 2 monomers differing by only 1 carbon atom in the alkyl group (e.g., $R_2$ =methyl and $R_3$ =ethyl) are not compatible with polystyrene (see Table 3).

Compatibility is also observed in copolymers comprised of methll methacrylate ($R_2$ =methyl) and hexyl methacrylate ($R_3$ =hexyl). The compatibility is particularly good with 60 wt.% methyl methacrylate and 40 wt.% hexyl methacrylate, while copolymers with 20:80 wt.% or 80:20 wt.% composition are not as compatible with polystyrene (see Table 4).

With a copolymer comprised of the monomers methyl methacrylate and decyl methacrylate, the optimal miscibility with polystyrene was found at 70 wt.% methyl methacrylate and 30 wt.% decyl methacrylate (see Table 2).

Viewed overall, the results indicate that, to obtain copolymers which are compatible with polystyrene the proportion of the comonomer with the longer chain alkyl group in the copolymer P2 must be smaller, the larger the alkyl chain of the given methacrylate ester. Thus, for the copolymer of methyl methacrylate and butyl methacrylate, good polystyrene compatibility was obtained at a comonomer ratio of 50:50; however, with copolymers of methyl methacrylate and decyl methacrylate the optimal ratio is 70:30.

For copolymers of methyl methacrylate and the methacrylate esters produced from a mixture of long-chain so-called tallow fat alcohols (12–20 carbon atoms, average 16.8–17.7 carbon atoms), compatibility with polystyrene is obtained with only 20 wt.% of the long-chain esters Comparable results were obtained in systems of methacrylate copolymers and poly-alpha-methylstyrene. Here also the compatibility was substantially better with a system comprised of copolymer and poly-alpha-methylstyrene than in a system comprised of the homopolymer and poly-alpha-methylstyrene.

Criteria of Compatibility

The inventive polymer mixtures are compatible polymer mixtures. In the sense of the invention and in accordance with the concepts and definition commonly used in polymer chemistry, compatible mixtures will be understood here to mean stable, homogeneous mixtures which macroscopically exhibit the properties of a single-phase material. (See Kirk-Othmer, loc. cit., pp. 446, 457–460; and Brandrup and Immergut, loc. cit., III:211.)

In agreement with the standard texts, the following will be considered as criteria of compatibility:

(I) Observation of the glass temperature Tg.

To the extent the polymer components have glass temperatures which differ sufficiently to be distinguished by differential scanning calorimetry (DSC), dilatometry, dielectric measurements, or radioluminescence spectroscopy, compatibility is indicated by a shifting or disappearance of the Tg's of the individual polymer components (see Olabisi et al., loc. cit., pp. 21 and 123). In general the glass temperature is <120° C. in the inventive polymer mixtures PM with polystyrene as the polymer component P1, and <150° C. with an alpha-methylstyrene-rich polymer component P1. The preferred polymer mixtures have polystyrene as polymer component P1 and a glass temperature <100° C.

(II) The "optical method".

For this method, a film is cast from a homogeneous solution of the polymer components, and is dried. There should be no optically determinable inhomogeneity in the film, even under magnification.

(III) Existence of a lower critical solution temperature (LCST).

As an additional test of the miscibility of different polymers, the occurrence of an LCST is evaluated. See Ger OS 34 36 476.5 and OS 34 36 477.3).

The occurrence of an LCST is indicated by the separation of a clear, homogeneous polymer mixture into phases upon heating, whereby it becomes optically cloudy to opaque. According to the literature, this behavior indicates that the original polymer mixture consisted of a single homogeneous phase at equilibrium.

The Polymer P1

The polymer P1 is produced in known fashion by polymerizing a monomer of formula I (see Vieweg, R., and Daumiller, G., 1969, "Kunststoff-Handbuch", Vol. V, "Polystyrene", pub. C. Hanser Verlag; 1978 "Ullmanns Encyclopaedie der techn. Chemie", 4th Ed., pub. Verlag Chemie, 19:265–268; and 1941 Houben-Weyl, 4th Ed., Vol. XIV/1, pub. Georg Thieme, pp. 753–841) The type of the polymer P1 used is not critical for the production and advantageous effects of the invention For example, polystyrenes in the molecular rate range 10,000 to 1,000,000 may be used. Styrene may be polymerized by radical, anionic, cationic, or coordinative techniques, preferably radical. The radical polymerization may be initiated thermally or by addition of radical initiators. In the industrial preparation, bulk polymerization or suspension polymerization is primarily used.

The compounds for use as initiators are the customary initiators, e.g. azo compounds or peroxy compounds, or redox initiators. The amount of initiator is generally in the range 0.05–2 wt.% based on the weight of the monomer present. Adequate polymerization rates can be provided over the entire specified temperature range by appropriate choice of initiators.

Whereas with polystyrene as the polymer P1, in a preferred embodiment the starting polymer P1 is a homopolymer (homopolystyrene), when poly-alphamethylstyrene is used as the polymer P1 as a rule the starting P1 is a copolymer. A preferred copolymer is, e.g., a copolymer of styrene and alpha-methylstyrene.

The Copolymer P2

The copolymer P2 may be produced in known fashion from the monomers of formula II and III, and optionally also monomer M, in general by radical polymerization or group-transfer polymerization (see Rauch-Puntigam, H., and Voelker, Th., 1967, "Acryl- und Methacrylvergindungen", pub. Springer Verlag; and Houben-Weyl., loc. cit , pp. 1010 ff.). The polymerization may be carried out in bulk, suspension, emulsion, or in solution For radical polymerization, preferably the customary initiators are used, e.g., peroxide initiators (particularly organic peroxides such as dibenzoyl peroxide or dilauroyl peroxide), azo compounds (e.g. azodiisobutryonitrile), or redox initiators, in customary amounts of about 0.01 to 2 wt.% based on the weight of the monomer present The initiating radicals may also be generated by high energy radiation. As regulators, the customary sulfur regulators may be used, for example; e.g., mercapto compounds. The molecular weight of polymer P2 has no appreciable limiting effect on the compatibility. However, as mentioned, the rule is that with increasing molecular weight of the polymer P2 there is a tendency toward decreasing compatibility with dissimilar polymers.

In general the copolymers have molecular weight MW (determined by light scattering) in the range 5,000–1,000,000, preferably 10,000–200,000. The non-uniformity is generally in the range 0.1–10.

Preferred are copolymers P2 which comprise monomer units of formula II in the amount 30–90 wt.% and monomer units of formula III in the amount 70–10 wt.%, where $R_3$ represents a linear alkyl group such as n-butyl, n-hexyl, or n-decyl, or the alkyl group of tallow fatty alcohols, or where $R_3$ represents n-pentyl, n-octyl, ethylhexyl, n-dodecyl, n-hexadecyl, or stearyl. $R_3$ may also represent an optionally substituted cyclohexyl group (other than cyclohexyl) with .5–15 carbon atoms The comonomers M, which may be present in amounts of 0–10 parts by wt., preferably 2–8 parts by wt., may be, e.g., monomers of formula IV

(IV)

where R is H or $CH_3$, and Q is a $—COOR_4$ group, with $R_4$ representing H or a cation M, particularly an alkali cation (e.g., sodium or potassium), or an ammonium cation. $R_4$ may be a preferably terminal alkyl group having a hydroxy group substituent or a substituent $-NR_5R_6$, where $R_5$ and $R_6$ independently, each represent an alkyl group with 1–6 carbon atoms or together along with the nitrogen form a 5- or 6-membered ring, or, if R is hydrogen, then $R_4$ represents an alkyl group with 1–24 carbon atoms, preferably 1–12 carbon atoms; or Q is a group

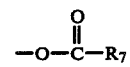

where $R_7$ represents an alkyl group with 1–3 carbon atoms; or Q is a phenyl group.

Preferred monomers of formula IV are, e.g., (meth)acrylic acid and salts thereof, hydroxyalkyl esters of (meth)acrylic acid, and aminoalkyl esters of (meth)acrylic acid.

Preparation of the Polymer Mixture PM

.The compatible polymer mixtures PM may be prepared by various methods, e.g. intensive mechanical intermixing of components P1 and P2 in the melt, in an extruder, etc. Or they may be prepared from a common solvent as so-called "solution cast polyblends" (see Kirk-Othmer, loc. cit., pp. 443–478). Also, the polymer PM can be dissolved in the monomer mixture of the other polymer P2, whereafter P2 is produced in the presence of P1. Alternatively, polymer P1 can be produced in the presence of P2. Also, the polymer mixture PM can be produced from common precipitants. There are no limitations on the type of mixing.

As a rule, a mixture of the components P1 and P2 is prepared first Advantageously, one starts with solids in the form of, e.g., polymer beads or granulate, and a slow mixing apparatus is used, e.g. a drum mixer, a spiral mixing wheel mixer, or a double chamber plow-type mixer. The slow mixing apparatus accomplishes mechanical mixing without eliminating the phase boundaries (see Ullmanns, loc. cit., 2:282–311).

Thermoplastic treatment is then carried out, with homogeneous mixing in the melt, using heatable mixing apparatus, employing temperatures suitable for the given mixture, e.g., 150° C. to about 300° C. in kneaders or preferably extruders. If an extruder is used it may be, for example, a single- or multiple-screw extruder, or an extruder with an oscillating screw and shear pins (e.g., a Bussco kneader).

With this technique, uniform grain granulate (e.g., hot-chopped granulate, cubes, or spheres) can be produced. The particle size of the granulate is in the range 2-5 mm.

A different method of preparing the polymer mixture PM is the mixing of polymer dispersions or suspensions, containing polymer component P1, and polymer dispersions containing polymer component P2. These dispersion mixtures may be coagulated together, spray dried together, or extruded together in an extruder. They may also be dried together to form a film.

Solvents and dispersion liquids for use in preparing solutions or dispersions of the polymer components P1 and P2 and polymer mixture PM are well known in the art. Any organic solvent which is capable of dissolving polymer components P1 and P2 may be used in the preparation of solution cast polyblends. Particularly preferred common solvents are relatively volatile aromatic solvents such as, for example, toluene, benzene, xylenes, etc.

The above formulas for the composition of the inventive polymer mixtures PM are exclusive of softeners, dyes and pigments, fillers, lubricants, and stabilizers which may also be added. These additives generally include those stabilizers, softeners, fillers, reinforcing agents, coloratts, and other additives mentioned in Gaechter, R., and Mueller, H., 1983, "Taschenbuch der Kunststoff Additive", 2nd Ed., pub. Carl Hanser Verlag, Munich and Vienna. In particular, reference is made to Chapter 3 thereof, entitled "Light protection agents for thermoplastic plastics", pp. 101–198. Regarding additives, see also Ullmanns, loc. cit., 15:253–273. The dyes mentioned in Ullmanns, loc. cit., 15:275–279, may also be used.

In addition to the polymer components P1 and P2, the polymer mixture PM may also contain 1-60 wt.% of a third polymer component P3 which is incompatible with P1 and P2. Such a polymer composition would therefore contain 40-99 wt.% of the compatible polymer mixture and 1-60 wt.% of component P3. As a rule, P3 is a rubber (e.g., polybutadiene or polybutyl acrylate). In general, this rubber is at least partially covalently linked with at least one of the two polymer components (e.g., polybutadiene with polystyrene). Mixtures containing P3 are as a rule rwo phase: 1 phase comprised of the compatible" polymer mixture P1 and P2, and 1 phase comprised of P3.

Advantageous Effects of the Polymer Mixtures PM

The inventive compatible polymer mixtures PM have the following advantages, which suggest corresponding application possibilities In the following list a-g, "polystyrene" is understood to be the polymer P1. In general, the uses of the inventive compatible polymer mixtures PM will be based on the application possibilities of polystyrene.

(a) A principal advantage is the compatibility of the polymer mixtures PM, affording optical and mechanical advantages over incompatible polymer mixtures.

(b) In contrast to the much more compatible mixtures of polystyrene and polycyclohexyl methacrylate, for which essentially no LCST can be established, the inventive polymer mixtures PM have an LCST, as a rule at <150° C. Moreover, the inventive copolymers are substantially less brittle than polycyclohexyl methacrylate. Because the compatibility is good with polystyrene-rich mixtures in particular, the inventively employed copolymer P2 is particularly suited to form in thin protective coating layers over a core portion of polystyrene or the compatible mixture PM. Thereby the problem of processing the shavings and the like is essentially solved.

(c) If polystyrene is coated with the copolymer P2, the protective layer which results has good adhesion, which can contribute to improved solvent resistance of the polystyrene. In addition, due to the changed index of refraction, the transmission of objects fabricated of polystyrene material is increased by about 2%. In virtually every case there is improvement in the weather resistance and in general in the service life of polystyrene objects by coating a polystyrene core with the copolymer P2, particularly where P2 contains 0.1-20 wt.% of UV protection agents and anti-aging compounds. The UV protection agent, i.e., a UV-absorbing substance may be blended into the copolymer P2 or may be present as a UV-absorbing monomer unit in copolymer P2.

(d) The advances in knowledge underlying the present invention can be exploited for producing optical gradient fibers. For example, gradient fibers with the following structure are possible:

Core: Polystyrene, $n_D^{20}=1.59$

Sheath: Copolymer P2, $n_d^{20}=1.49$, wherewith the transition from core to sheath is continuous.

(e) Based on the pronounced LCST behavior, use as optical switches is a possibility (see Ger. OS 34 36 476).

(f) The copolymers P2 may be used as agents to improve processability of polystyrene. In such cases it is recommended that 1-10 wt.% of a thermostabilizing comonomer M be added, particularly the monomer of formula IV, where R preferably represents hydrogen.

(g) Use of the inventive polymer mixtures PM in the paint sector is of particular interest. Preferably the copolymer P2 in this case contains comonomer M, particularly in the form of a functional monomer, e.g. (meth)acrylic acid, dimethylaminoetnyl (meth)acrylate, dimethylaminopropyl (meth)acrylate, hydroxyethyl (meth)acrylate, etc. Particularly noteworthy are copolymers P2 wherein $R_2$ represents methyl and $R_3$ represents n-butyl.

The compatible polymer mixtures of the present invention may be formed into polymer articles by conventional methods. For example, molded polymer articles, films, fibers, plates, etc. may be prepared by conventional injection molding or extrusion processes. Similarly, core/sheath articles such as polystyrene coated with copolymer P2 and optical gradient fibers may be prepared by conventional means.

Having generally described this invention, a further understanding can be obtained by reference to certain specific examples which are provided herein for purposes of illustration only" and are not intended to be limiting unless otherwise specified.

EXAMPLES

Homopolymeric polystyrene with J=22 ml/g is used as polymer component P1.

The viscosity $\eta$ it is determined according DIN Standard 7745, Part 2, Para. 3, or ISO 1628/6.

A. Production of the Copolymer P2:

The monomers of formulas II and III and (if applicable) monomer M were mixed in the desired proportions in a vessel with a stirrer (see Tables). 0.2 wt.% (based on the weight of the monomers) lauroyl peroxide, 0.1 wt.% tert-butyl per-2-ethylhexanoate, and about 0.3 wt.% dodecyl mercaptan were added. The resulting mixture was transferred to a plastic bag (Hostaphan ®, supplied by Hoechst AG) and was polymerized therein as follows: 45–65 hr at 50° C. in a water bath, followed by tempering 17 hr at 90° C.

B. Preparation of the Polymer Mixtures PM:

The copolymer P2 was dissolved in toluene to form a 20 wt.% solution, and was mixed with a solution of polystyrene (also 20 wt.%, in toluene). Films were cast from the mixtures. These films were dried in vacuum, first 24 hr at room temperature and then 24 hr at 50° C.

The results of the above procedures (A) and (B) are presented in the following Tables.

Table 1:

Evaluation of the compatibility of mixtures prepared from a copolymer P2 (methyl methacrylate and n-butyl methacrylate) and polystyrene. Polymer P1 is polystyrene with $\eta=22$ ml/g; and copolymer P2 is 50 wt.% methyl methacrylate and 50 wt.% n-butyl methacrylate, with $\eta=53$ ml/g.

Compatibility (+) is demonstrated by formation of a highly transparent film.

TABLE 1

| Mixture ratio P1:P2 | Compatibility |
| --- | --- |
| 95:5 | + |
| 90:10 | + |
| 80:20 | + |
| 50:50 | + |

TABLE 1-continued

| Mixture ratio P1:P2 | Compatibility |
| --- | --- |
| 20:80 | + |

Table 2:

Evaluation of the compatibility of mixtures prepared from a copolymer P2 (of methyl methacrylate and n-decyl methacrylate) and polystyrene, as a function of the ratio of the comonomers.

TABLE 2

| Monomer unit composition of copolymer P2 (wt. %) | | $\eta$ (ml/g) | Mixture Ratio in Polymer Mixture PM, Copolymer P2: Polystyrene (wt. %) | | | | | |
| --- | --- | --- | --- | --- | --- | --- | --- | --- |
| MMA | n-Decyl-methacrylate | | 2:98 | 5:95 | 10:90 | 20:80 | 50:50 | 80:20 |
| 20 | 80 | 47 | —* | — | — | — | — | — |
| 50 | 50 | 54 | — | — | — | — | — | — |
| 70 | 30 | 63 | +** | + | + | + | + | + |
| 80 | 20 | 54 | + | +/—*** | — | — | — | — |
| 80 | 20 | 38 | n.d.**** | n.d. | n.d. | +/— | — | — |
| 90 | 10 | 59 | n.d. | — | — | — | — | — |

—*: Incompatible, as demonstrated by cloudy film.
+**: Compatible, as demonstrated by a highly transparent film.
+/—***: Borderline compatible (compatible at room temperature, with de-mixing beginning at 50° C.).
n.d.****: Not determined.

TABLE 3

| Mixture Ratio* | 5:95 | 10:90 | 20:80 | 50:50 | 80:20 | 90:10 | 95:5 |
| --- | --- | --- | --- | --- | --- | --- | --- |
| Compatibility | — | — | — | — | — | — | — |

*: Ratio of copolymer of methyl methacrylate and ethyl methacrylate 50:50, $\eta = 52$ ml/g) to polystyrene (wt. %)

From these results, one can draw the conclusion that the copolymer of MMA and ethyl methacrylate is incompatible with polystyrene.

Table 4:

Evaluation of the compatibility of mixtures prepared from copolymers of methyl methacrylate and n-hexyl methacrylate with polystyrene, as a function of the ratio of the comonomers.

TABLE 4

| Comonomer Proportions (wt. %) | | $\eta$ (ml/g) | Mixture Ratio of the Copolymer to Polystyrene (wt. %) | | | | | | |
| --- | --- | --- | --- | --- | --- | --- | --- | --- | --- |
| methyl-methacrylate | n-hexyl methacrylate | | 1:99 | 2:98 | 5:95 | 10:90 | 20:80 | 50:50 | 80:20 |
| 20 | 80 | 50 | —* | — | — | — | — | — | — |
| 20 | 80 | 32 | n.b.** | n.b. | n.b. | n.b. | — | — | — |
| 50 | 50 | 52 | +*** | + | + | + | + | (—)**** | (—) |
| 50 | 50 | 32 | n.b. | n.b. | n.b. | n.b. | + | (—) | (—) |
| 60 | 40 | 46 | + | + | + | + | + | + | + |
| 80 | 20 | 52 | +/—# | +/— | — | — | — | — | — |
| 80 | 20 | 33 | n.b. | n.b. | n.b. | n.b. | — | — | — |

—*: Incompatible
n.b.**: Not determined
+***: Compatible
(—)****: Problems occurred in the drying of the film, marked clouding upon heating to 200° C., which would indicate compatibility at room temperature
+/—#: Borderline compatible Table 5:

Phase diagram of an inventive polymer mixture PM. De-mixing temperature as a function of the composition of the polyblend. (Visual evaluation from films cast from toluene.)

Polymer P1:
Poly-alpha-methylstyrene (m.w. 50,000). Polymer P2: Copolymer comprised of methyl methacrylate (60 wt.%) and hexyl methacrylate (40 wt.%), with J-value=46 ml/g.

TABLE 5

| Composition of Polymer Mixture PM | | Cloud Point | |
|---|---|---|---|
| P1 (wt. %) | P2 (wt. %) | (°C.) | Remarks |
| 95 | 5 | 168 | Bubbles* |
| 90 | 10 | 160 | |
| 80 | 20 | 162 | |
| 70 | 30 | 167 | |
| 60 | 40 | 170 | |
| 50 | 50 | 176 | |
| 40 | 60 | 182 | Bubbles |
| 30 | 70 | 184 | Bubbles |
| 20 | 80 | >190 | Bubbles |
| 10 | 90 | >190 | Bubbles |
| 5 | 95 | >190 | Bubbles |

*: Bubbles, due to decomposition of poly-alpha-methylstyrene

Obviously, numerous modifications and variations of the present invention are possible inlight of the above teachings. It is therefore to be understood that within the scope of the appended claims, the invention may be practiced otherwise than as specifically described herein.

We claim:

1. A polymer article formed of a compatible polymer mixture, comprising:
   (I) 0.1–99.9 wt.% of a polymer P1 which is formed from monomer units of the formula I:

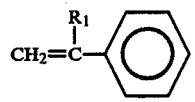
(I)

wherein $R_1$ is hydrogen or a methyl group; and
   (II) 99.9–0.1 wt.% of a copolymer P2 prepared from:
   30–90 parts by wt. of a methacrylic acid ester monomoer of formula II:

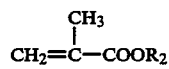
(II)

wherein $R_2$ is methyl or ethyl;
   70–10 parts by wt. of a methacrylic acid ester monomer of the formula III:

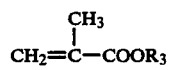
(III)

wherein $R_3$ is a hydrocarbon group of 3–24 carbon atoms; and
   0–10 parts by wt. of a third monomer M which is copolymerizable with but different from the monomers of formulas II and III, said polymer P1 component forming the core portion of said polymer article while polymer P2 constitutes a coating on said core portion.

2. The polymer article of claim 1, wherein polymer P2 contains 0.1–20 wt.% based on the weight of polymer P2 of a UV-absorbing substance.

3. The polymer article of claim 2, wherein said UV-absorbing substance is a monkomer unit of polymer P2.

4. The polymer article of claim 1, wherein said article is an optical gradient fiber.

5. A polymer article prepared from a compatible polymer mixture, comprising:
   (I) 0.1–99.9 wt.% of a polymer P1 prepared from monomer units of the formula I:

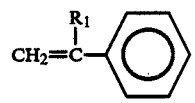
(I)

wherein $R_1$ is hydrogen or a methyl group; and
   (II) 99.9–0.1 wt.% of a copolymer P2 prepared from:
   30–90 parts by wt. of a methacrylic acid ester monomer of formula II:

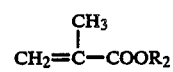
(II)

wherein $R_2$ is methyl or ethyl;
   70–10 parts by wt. of a methacrylic acid ester monomer of formula III:

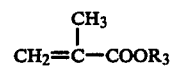
(III)

wherein $R_3$ is a hydrocarbon group of 3–24 carbon atoms; and
   0–10 parts by wt. of a third monomer M which is copolymerizable with but different from the monomers of formulas II and III, the article being formed of a core portion of the stated polymer mixture of components P1 and P2 with the core having a coating portion from polymer P2.

6. The polymer article of claim 5, wherein polymer P2 contains 0.1–20 wt.% based on the polymer P2 of a UV-absorbing substance.

7. The polymer article of claim 6, wherein said UV-absorbing substance is a monomer unit of polymer P2.

* * * * *